United States Patent

Nelson

[15] 3,686,721
[45] Aug. 29, 1972

[54] CIRCULAR CLAMP FOR BALLOONS OR THE LIKE

[72] Inventor: Leroy E. Nelson, Minneapolis, Minn.

[73] Assignee: Winzen Research, Inc., Minneapolis, Minn.

[22] Filed: Oct. 29, 1970

[21] Appl. No.: 85,208

[52] U.S. Cl..................................24/243 K, 244/31
[51] Int. Cl............................A44b 21/00, B64b 1/40
[58] Field of Search .244/126, 125 US, 31; 24/243 K, 24/243 M, 243 N

[56] References Cited

UNITED STATES PATENTS

| 600,852 | 3/1898 | Baisley | 24/243 M UX |
| 1,021,555 | 3/1912 | Purat | 24/243 N UX |
| 2,109,529 | 3/1938 | Goddard | 244/125 X |
| 2,919,082 | 12/1959 | Winzen et al. | 244/31 |
| 2,919,083 | 12/1959 | Suomi et al. | 244/31 |
| 2,960,282 | 11/1960 | Winzen | 244/31 |

*Primary Examiner*—Donald A. Griffin
*Attorney*—Carlsen, Carlsen & Sturm

[57] ABSTRACT

The apex end of a tape-reinforced balloon envelope is clamped between two segmented clamping rings which are mounted on a disc-shaped base member. The joint between the two segmented clamping rings is sealed by means of two resilient O-rings which function both as a gas seal and as a mechanical clamp for the reinforcing tapes and the balloon envelope. The O-rings rest in parallel grooves cut in the lower segmented ring and are compressed by matching tangs that project from the upper segmented ring. The grooves, tangs, and O-rings are dimensioned to provide the same O-ring compression factor for different thicknesses of material between the two segmented rings. The joints between the ends of the individual segments of the two clamping rings are staggered with respect to each other and each joint is sealed with a sealant or gasket material to block the escape of gas therethrough. A resilient gasket is interposed between the lower segmented clamping ring and the disc-shaped base member to which it is attached.

14 Claims, 4 Drawing Figures

PATENTED AUG 29 1972

INVENTOR.
LEROY E. NELSON
BY
Carlsen Carlsen & Sturm
ATTORNEYS

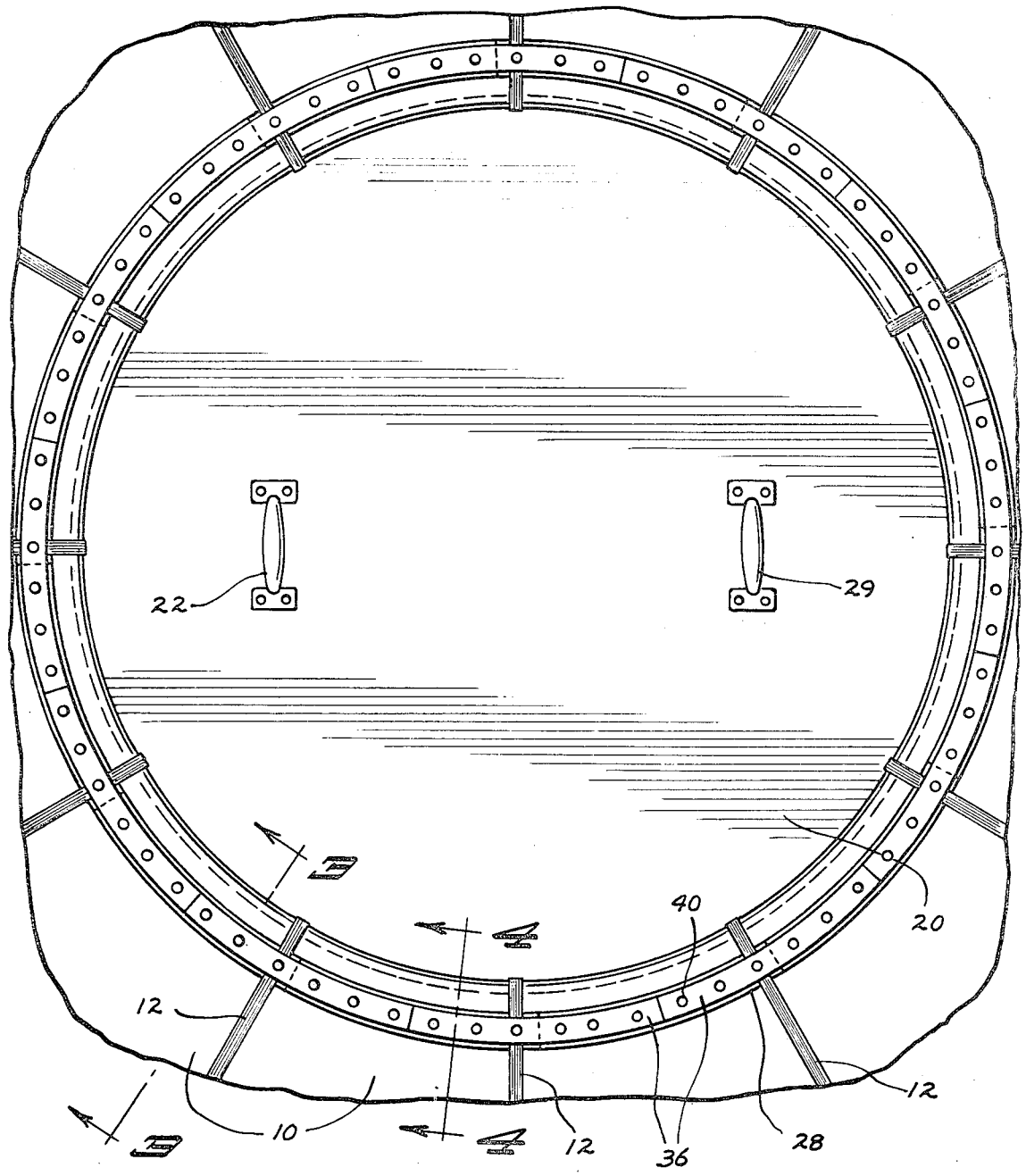

CIRCULAR CLAMP FOR BALLOONS OR THE LIKE

BACKGROUND OF THE INVENTION

This invention relates to circular clamps for sealing off the apex end of tape-reinforced balloons or the like. In the manufacture of high altitude balloons for scientific research, it is customary to form the balloon envelope from a plurality of relatively long, narrow gores which are made of a thin, tough, gas-impermeable plastic film such as polyethylene or the like. The gores are joined together at their side edges by heat seals or some other type of gas impervious seam, and the seams are usually reinforced by synthetic fiber tapes which constitute the load bearing elements of the balloon envelope. In such balloons, it is necessary to provide both a mechanical clamp at the top or apex end of the balloon envelope for mechanical joining the load bearing tapes together and a gas seal for the envelope per se. Several different methods of achieving these objectives have been employed in the past, as disclosed, for example, in U.S. Pat. No. 2,919,082, which was issued to O. C. Winzen et al., on Dec. 29, 1959, for a "Balloon Having Reinforcing Structure," and in U.S. Pat. No. 2,771,256, which was issued to J. J. Ryan on Nov. 20, 1956, for a "Balloon With Load Supporting Tapes."

As disclosed in the above-noted patents, it has been the practice in the past to provide two separate apex closures for the balloon envelope: a mechanical clamp for the load bearing tapes, and a separate gas seal for the envelope per se, as best shown in FIG. 2 of U.S. Pat. No. 2,771,256, and in FIGS. 7 and 10 of U.S. Pat. No. 2,919,082. The use of separate closures is, however, inconvenient in practice, and the principal object of this invention is to provide a circular clamp that will function both as a mechanical clamp and as a gas seal.

Several problems arise in connection with combining the mechanical clamp and gas seal functions in a single circular clamp. Circular clamps have been used in the past for the mechanical clamping function alone, as disclosed, for example, in FIG. 10 of U.S. Pat. No. 2,919,082, but such circular clamps have lacked the precision necessary to form a good gas seal. Moreover, because of the relatively large size required in such clamps, the achievement of the necessary precision involves considerable expense due to the fact that close tolerances are difficult to hold on large cast rings and mold costs are prohibitive because of size. Accordingly, it is a further object of this invention to provide a novel circular clamp in which a relatively high degree of precision can be obtained at a relatively low cost.

SUMMARY OF THE INVENTION

In accordance with this invention, the above-noted objects are achieved by providing two segmented clamping rings which are mounted on a disc-shaped base member. The clamping rings are made of a relatively large number of identical segments which can be made by die casting, molding, or machining techniques. The segmentation of the clamping rings makes it possible to achieve a high degree of precision in the clamping rings at a relatively low cost. The individual segments are butt-joined together, with the butt-joints between the upper and lower rings being staggered with respect to each other, and all of the butt-joints being rendered gas-impervious by means of a sealant or gasket material. The joint between the two segmented clamping rings is sealed by means of two resilient O-rings which function both as a gas seal and as a mechanical clamp for the reinforcing tapes and the balloon envelope. The two O-rings rest in parallel grooves cut in the lower segmented ring and are compressed by matching tangs that project from the upper segmented ring. The grooves, tangs, and O-rings are dimensioned to provide the same O-ring compression factor for different thicknesses of material between the two segmented rings, with the O-ring compression factor being great enough to withstand the normal mechanical shocks applied to the load bearing tapes which are to be secured between the two segmented clamping rings. A resilient gasket is interposed between the lower segmented clamping ring and the disc-shaped base member to which it is attached.

DESCRIPTION OF THE DRAWINGS

FIG. 2 is a plan view taken upon the plane 2—2 of FIG. 1.

DESCRIPTION OF THE INVENTION

Figure 1:
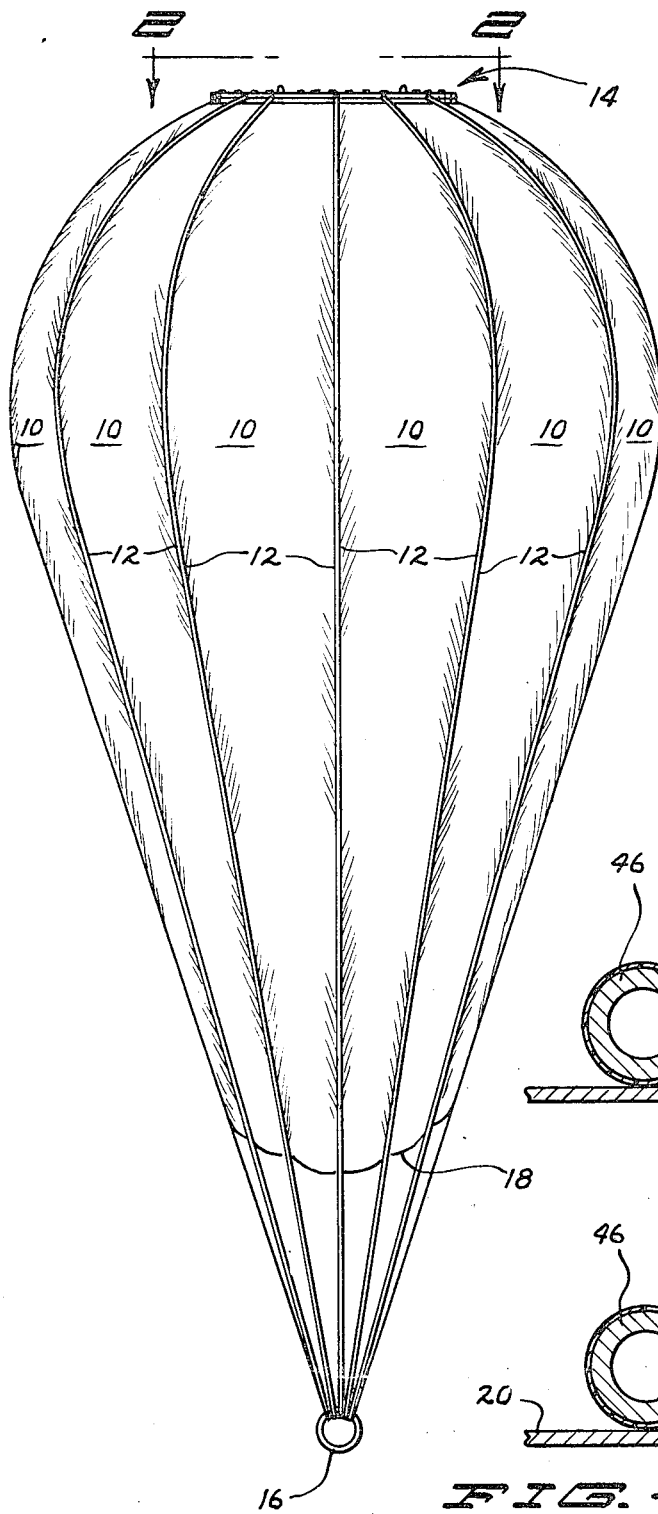
FIG. 1 is an elevation view of a balloon which utilizes one illustrative embodiment of the invention.

FIG. 1 is an elevation view of a typical balloon which utilizes one illustrative embodiment of the invention. The balloon envelope comprises a plurality of relatively long, narrow gores 10 which are made of a thin, tough, gas-impervious plastic film such as polyethylene or the like. The gores 10 are heat sealed at their side edges to each other and the side edge seams are reinforced by load bearing tapes 12 which are made of synthetic fiber, or some other suitable load bearing material. Load bearing tapes 12 are preferably covered with a plastic film and are heat sealed to their respective seams. The tapes 12 are clamped at the top or apex end of the balloon envelope by a clamping ring assembly 14 and are secured at their lower end to a load bearing ring 16 to which the pay load of the balloon (not shown in the drawings) is attached. The lower or appendix end of the gores 10 are terminated at 18 and left open in this example to form an open appendix. It will be understood by those skilled in the art, however, that the gores 10 could be sealed together at their appendix end if desired, and also that in this case a second clamping assembly 14 could be used at the appendix end of the balloon.

Figure 3:
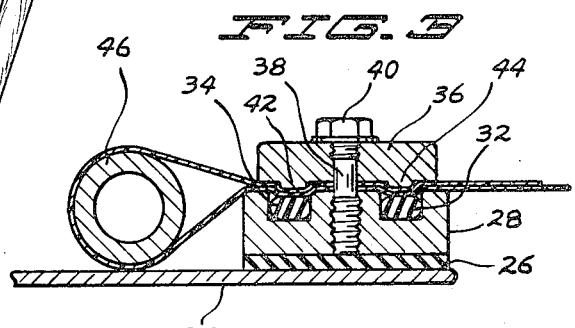
FIG. 3 is a cross-sectional view taken upon the plane 3—3 of FIG. 2.
Figure 4:
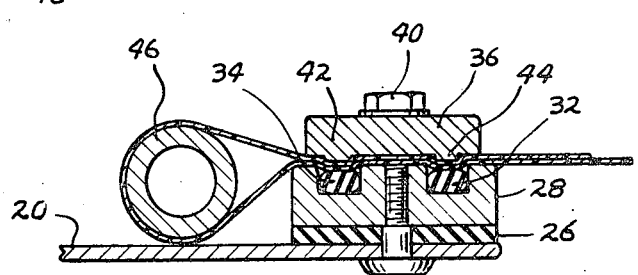
FIG. 4 is a cross-sectional view taken upon the plane 4—4 of FIG. 4.

FIGS. 2, 3, and 4 show the structural details of the clamping ring assembly 14, which is mounted on a relatively flat, disc-shaped base plate 20. Base plate 20 is made of sheet metal and has two handles 22 and 24 attached thereto for handling purposes. The clamping rings comprise a plurality of identical segments which are disposed in a generally circular pattern around the periphery of base plate 20 and are attached thereto by bolts. As best shown in FIGS. 3 and 4, a circular resilient gasket 26 is interposed between the lower clamping ring and base plate 20. The lower clamping ring comprises a plurality of identical segments 28 which are attached to base plate 20 by bolts 30 which extend through openings in base plate 20 and gasket 26 and engage threaded openings in the segments 28. The segments 28 are arc-shaped and have radially oriented ends which form a relatively tight butt-joint when the segments are disposed in a circle around the periphery of base plate 20 as shown in FIG. 2. In this particular embodiment of the invention, the completed ring contains twelve of the segments 28, but it will be apparent to those skilled in the art that the number of segments in the ring can be varied at will, and also that the length of the segments must be computed in accordance with the number of segments so that they will fit together when they are disposed in a circle around the periphery of base plate 20 as shown in FIG. 2. The butt-joints between the individual segments 28 are preferably sealed by means of a suitable adhesive/sealant or gasket material to block the escape of gas therethrough.

Each of the individual segments 28 have two arc-shaped, coaxial grooves for receiving two resilient O-rings 32 and 34, which act both as mechanical clamps and as gas seals for the balloon envelope and reinforcing tapes. The resilient O-rings 32 and 34 are compressed by tangs which project from the upper clamping ring, as will be described in later paragraphs.

The upper clamping ring comprises a plurality of identical segments 36 which are disposed in a generally circular pattern on top of the lower clamping ring segments 28 but with the butt-joints between the upper segments 36 being staggered with respect to the butt-joints between the lower segments 28 as shown in FIG. 2, where the solid radial lines around the clamping ring indicate butt joints between the upper segments 36 and the dashed radial lines indicate butt joints between the lower segments 28. It will be understood by those skilled in the art that this staggering of the butt joints provides mechanical rigidity for the clamping rings and also improves the gas seal between the two rings. The upper segments 36 are secured to lower segments 28 by means of studs 38 (FIG. 3) and nuts 40. Studs 38 are screwed into threaded openings in lower segments 28 and project through matching openings in upper segments 36 to engage the nuts 40. As shown in FIG. 2, six studs 38 are provided for each of the upper segments 36, but it will be apparent to those skilled in the art that a larger or smaller number of studs could be used if desired.

Each of the upper segments 36 has two arc-shaped, coaxial, downwardly projecting tangs 42 and 44 which are positioned to engage the center of resilient O-rings 32 and 34 to apply a compressional force thereto. The tangs 42 and 44 are narrower in width than the O-rings 32 and 34 and produce the same compression in the O-rings for different thicknesses of material between the upper and lower clamping segments. With respect to the design parameters for the O-rings 32 and 34 and the tangs 42 and 44, it is preferable for the O-rings to fit snugly within their grooves and to be approximately flush with the top surface of lower segments 28 in their uncompressed state. This condition is achieved by making the depth and width of the grooves approximately equal to the cross-sectional diameter of the O-rings. The tangs 42 and 44 must be sufficiently narrower than the O-rings to prevent the material between the two clamping rings from being cut or sheared between the edge of the tang and the matching edge of the groove when the upper and lower segments are clamped together. In quantitive terms, this means that the difference of width between the tangs and their opposing grooves should be equal to or greater than approximately twice the maximum width of the material which is to be clamped between the two segments. In the disclosed embodiment, the thickness of the material varies from 0.025 inch to 0.075 inch, and the following dimensions have been found to be satisfactory in producing substantially equal compression of the O-rings:

O-ring diameter = 0.075 inch
Groove depth = 0.275 inch
Groove width = 0.280 inch
Tang width = 0.187 inch
Tang depth = 0.050 inch The corners of the tangs and grooves are preferably rounded to avoid damage to the material thereinbetween. It should be understood that the above-noted dimensions are exemplary and that considerable variation may be necessary or desirable in other applications of the invention.

In the disclosed embodiment of the invention, the apex end of the balloon envelope is doubled around the hoop 46 and heat sealed to itself on the outside of the clamping ring assembly. Although this is desirable because it increases the strength of the mechanical clamping of the balloon envelope and the load bearing tapes, it should be understood that the hoop 46 is not a part of the invention, and that the hoop 46 is optional in the sense that the clamping assembly 14 can be used without hoop 46 if desired.

From the foregoing description it will be apparent that this invention provides a novel circular clamp which functions both as a mechanical clamp and as a gas seal at the apex end of a tape-reinforced balloon envelope, and also provides a relatively high degree of precision at a relatively low cost, and maintains an effective gas seal in spite of variations of thickness in the balloon envelope. And although this invention has been described in connection with one illustrative embodiment thereof, it should be understood that many modifications can be made in the disclosed structure without departing from the basic principles of this invention. For example, although two O-rings have been used in the disclosed embodiment, it is clear that three or four or more O-rings can be employed if necessary in other embodiments where a tighter seal is required. Many similar modifications of the disclosed structure will be apparent to those skilled in the art, and this invention includes all modifications falling within the scope of the following claims.

I claim:

1. A circular clamp for sealing the periphery of an aperture in balloons or the like comprising a disc-shaped base member, a first plurality of clamp segments attached to one side of said base member and disposed in a generally circular pattern around the periphery thereof to form a first segmented clamp ring, a like second plurality of clamp segments, means connecting said second plurality of clamp segments to said first plurality of clamp segments to form a second segmented clamp ring, and at least one resilient O-ring and the envelope of a balloon or the like disposed between said first and second segmented clamp rings.

2. A circular clamp as defined in claim 1 and further comprising a groove formed in said first plurality of clamp segments for receiving said resilient O-ring and a projecting tang formed in said second plurality of clamp segments for applying a compressive force to said resilient O-ring.

3. A circular clamp as defined in claim 2 wherein the depth and width of said groove is approximately equal to the cross-sectional diameter of said O-ring.

4. A circular clamp as defined in claim 3 wherein said projecting tang is narrower in width than said groove.

5. The apparatus of claim 2 in which the joints between the first plurality of clamp segments and the joints between the second plurality of clamp segments are staggered.

6. A circular clamp as defined in claim 1 and further comprising a second resilient O-ring disposed between said first and second segmented clamp rings.

7. A circular clamp as defined in claim 6 and further comprising two grooves formed in said first plurality of clamp segments for receiving said first and second resilient O-rings and two projecting tangs formed in said second plurality of clamp segments for applying a compressive force to said first and second resilient O-rings.

8. A circular clamp as defined in claim 7 wherein the depth and width of each groove is approximately equal to the cross-sectional diameter of the corresponding O-ring.

9. A circular clamp as defined in claim 8 wherein said projecting tangs are narrower in width than the corresponding groove.

10. A circular clamp as defined in claim 9 and further comprising a resilient gasket disposed between said first segmented clamp ring and said base member.

11. A circular clamp as defined in claim 10 and further comprising an adhesive/sealant material disposed between the segments of said first segmented clamp ring.

12. The apparatus of claim 7 in which the joints between the first plurality of clamp segments and the second plurality of clamp segments are staggered.

13. The apparatus of claim 6 in which the joints between the first plurality of clamp segments and the second plurality of clamp segments are staggered.

14. The apparatus of claim 1 in which the joints between the first plurality of clamp segments and the joints between the second plurality of clamp segments are staggered.

* * * * *